Sept. 4, 1962 J. E. DAVIS ETAL 3,052,752

COLOR TELEVISION RECEIVER WITH SCREEN GRID-KEYED CHROMA AMPLIFIER

Filed June 28, 1956 3 Sheets-Sheet 1

Inventors
JOSEPH E. DAVIS and
GEORGE SCHIESS
by *Mason, Kolehmainen, Rathburn and Wyss.*
Attorneys Inventors
JOSEPH E. DAVIS and
GEORGE SCHIESS
by
Mason, Kolehmainen, Rathburn and Wyss.
Attorneys Inventors
JOSEPH E. DAVIS and
GEORGE SCHIESS
by
Mason, Kolehmainen, Rathburn and Wyss
Attorneys 3,052,752
Patented Sept. 4, 1962

3,052,752

COLOR TELEVISION RECEIVER WITH SCREEN GRID-KEYED CHROMA AMPLIFIER

Joseph E. Davis, Buffalo, N.Y., and George Schiess, Waverly, Mass., assignors, by mesne assignments, to Sylvania Electric Products, Inc., Wilmington, Del., a corporation of Delaware Filed June 28, 1956, Ser. No. 594,449
2 Claims. (Cl. 178—5.4)

The present invention relates to color television receivers, more particularly to the so-called chroma channel portions of color television receivers, and the invention has for an object the provision of a new and improved combined burst and chroma signal amplifying arrangement.

In the present-day color television receivers the modulated subcarrier or chroma signal portion of the received color television signal is separated out of the composite signal, is amplified in a band-pass amplifier and supplied to the color demodulator circuits. The color synchronizing signal, herein referred to as the burst signal, is separated out of the received composite television signal, is amplified in a band-pass amplifier, and employed to synchronize a color subcarrier oscillator in the receiver, which oscillator develops a subcarrier frequency reference wave of the proper phase relationship for use in demodulating the chroma signal. The amplified chroma signal is demodulated by employing synchronous demodulators to which the chroma signal and color subcarrier reference waves are supplied so that the necessary color difference signals are produced. These color difference signals are then combined with the amplified luminance signal in a suitable matrix to provide the desired red, blue and green signals which are impressed upon the three electron guns of a tri-color picture tube.

Since the automatic chrominance control voltage for controlling the gain of the chroma channel in accordance with the strength of the received color television signal is best obtained by detecting a portion of the burst signal, and moreover, to accurately synchronize the local subcarrier wave reference oscillator with the received burst frequency, it is necessary that the chroma signal be prevented from entering the phase detector. Such removal of the chroma signal from the burst signal channel is commonly accomplished by means of a burst gate circuit which renders the burst channel effectively inoperative except during the retrace interval when only the burst signal is present in the received television signal.

Although it would obviously be desirable to amplify the burst signal in the chroma amplifier so as to reduce the number of tubes required in the receiver and also to improve the overall stability of the chroma and burst channels, the prior art amplifiers which have been designed for this purpose have not operated altogether satisfactorily principally because the burst signal should be amplified a greater amount than the chroma signal. Since the commercially available pentode tubes which are most suited for use in chroma amplifiers have a relatively narrow grid bias range, if a one-tube prior art type amplifier is designed to operate efficiently during reception of the chroma signal it operates very inefficiently during reception of the burst signal and if the amplifier is designed to operate efficiently during reception of the burst signal it operates inefficiently during reception of the chroma signal.

Therefore, another object of the present invention is to provide a new and improved circuit for amplifying, in a color television receiver, the chroma and burst signals.

A further object of the present invention is to provide in a color television receiver an amplifier circuit which operates efficiently to amplify both the received chroma signal and the received burst signal.

A still further object of the present invention is to provide a new and improved amplifying circuit which employs a single tube for translating both the chroma signal and the burst signal and which provides the desired gain for both signals.

Another object of the present invention is to provide a new and improved automatic gain control circuit for use in the chroma circuits of a color television receiver.

Briefly, the above and further objects are realized in accordance with the present invention by providing a novel gain control circuit for a chroma and burst signal amplifier which novel circuit enables the efficient operation of a single tube amplifier in both the chroma and burst regions of signal grid operation. In a preferred embodiment of the invention, the chroma and burst signals are supplied to the signal grid of a pentode amplifier, and the screen grid is supplied with a relatively high level positive going pulse of voltage during the occurrence of the burst signal so that the gain of the pentode is increased by a substantial amount while the burst signal is being received. Consequently, the chroma and burst signals may be set up at the same operating point on the signal grid, thus permitting the use of a burst signal derived automatic chrominance control voltage for automatically controlling the gain of the pentode during reception of both the chroma signal and the burst signal.

The invention, both as to its organization and method of operation, together with further objects and advantages thereof, will best be understood by reference to the following detailed description taken in connection with the accompanying drawings, in which.

Figure 1:
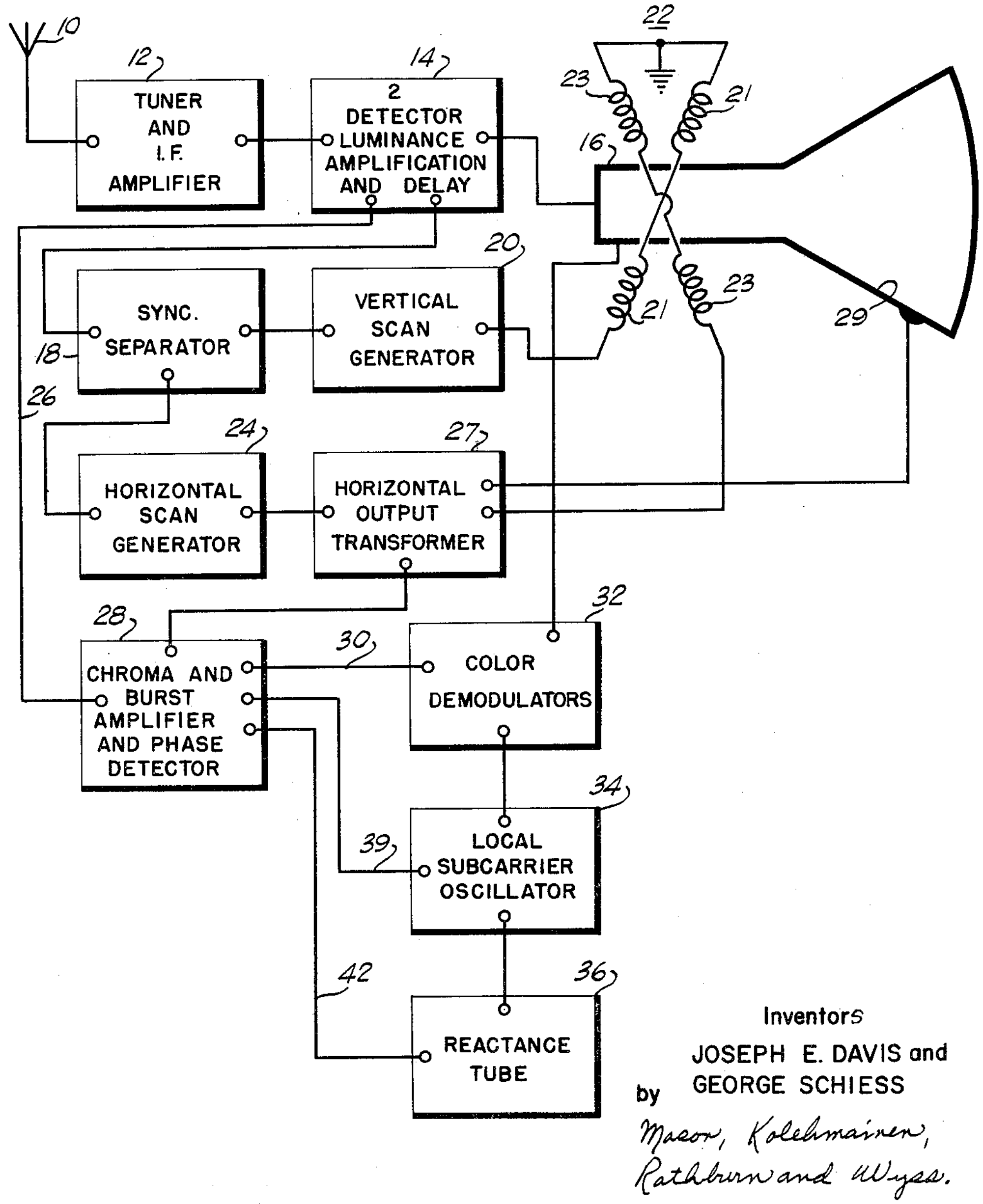
FIG. 1 is a block diagram of the circuitry of a color television receiver embodying the features of the present invention.

Referring now to the drawings, and particularly to FIG. 1 thereof, there is shown a color television receiver comprising a conventional antenna system 10 connected so as to supply a received color television signal to a tuner and intermediate frequency amplifier 12 wherein a particular set of audio and video carrier waves are selected and reduced in frequency to corresponding modulated waves of an intermediate frequency. Since the audio circuits of color television receivers are well known and do not constitute a part of the present invention, for purposes of clarity these audio circuits are not shown in the circuit diagram of FIG. 1.

The video and color subcarrier modulated intermediate frequency wave appearing at the output of the tuner and IF amplifier 12 is applied to a second detector luminance amplifier and delay circuit 14 wherein the intermediate frequency carrier wave is detected and the luminance signal is amplified and delayed. In the particular receiver illustrated, the amplified luminance signal is supplied directly to the control grids or cathodes of a conventional three-gun color television picture tube 16 wherein the luminance signal is added to the color difference signals in the conventional manner to control the intensity of the cathode ray beams of the tube in accordance with the desired red, blue, and green intensities.

The detected cathode ray deflection synchronizing wave is supplied to a conventional sync separator circuit 18 wherein the field or vertical synchronizing pulses are separated from the line synchronizing pulses for application to a vertical scanning generator 20. The output of the vertical scanning generator 20 is, conventionally, a saw-tooth wave having a frequency of sixty cycles per second which is supplied to the vertical deflection coil 21 of a deflection yoke assembly 22.

The line or horizontal synchronizing pulses from the sync separator 18 are supplied to a horizontal scan generator 24 which develops a suitable horizontal scanning wave in the secondary winding of a horizontal output deflection transformer 27, the secondary winding of the transformer 27 energizing the horizontal sweep coil 23 of the yoke assembly 22 and being used to develop the energizing voltage for the second anode 29 of the picture tube 16.

The detected composite wave from the second detector 14 is coupled by means of a conductor 26 to a unit 28, which includes a burst and chroma amplifier, a chroma killer, chroma and burst separator circuits and a phase detector. During the retrace intervals gating pulses are coupled from the transformer 27 to the unit 28. As described in greater detail hereinafter, the unit 28 separates the chroma and burst signals from the video signal, amplifies the chroma signal and the burst signal, and separates the chroma signal from the bust signal before steering each of these signals to their respective utilization circuits. The amplified and separated chroma signal may thus be coupled to the color demodulators 32 via a cable 30 wherein the color difference signals are developed and coupled to the respective electron guns of the three-gun color picture tube 16. The unit 28 also provides an AFC voltage which is supplied via the conductor 42 to a reactance tube 36 which controls the phase of oscillation of a local subcarrier oscillator 34, which oscillator provides the locally developed subcarrier frequency wave which is necessary for demodulating the chroma signal.

The color television receiver as thus far described is substantially conventional and the use of conventional circuits as known in the prior art for each of the units with the exception of the unit 28 is possible without adversely affecting the operation of the unit 28 or the operation of the receiver as a whole. Although the operation of a color television receiver of the type shown in FIG. 1 is well known to those skilled in the art, briefly, its operation is as follows: A composite color television signal received by the antenna 10 is applied to the tuner 12 for amplification and selection before being supplied to the second detector 14 wherein the video carrier is removed from the received wave to provide the video signal, the modulated color subcarrier wave and the synchronizing waves. The horizontal and vertical deflection components of the received signal are separated by the separator 18 and are applied to the respective horizontal and vertical scanning systems 20 and 24 to control the synchronized operation thereof. The scanning signal applied from the output circuit of the generator 20 to the vertical scanning winding 21 and the scanning signal applied to the horizontal scanning winding 23 from the line scan generator 24 cause the cathode ray beam tube 16 to sweep a plurality of horizontal lines to produce a raster on the screen of the tube 16. The reactance tube 36, the local oscillator 34 and the chroma demodulator circuits 32 also operate conventionally in that they cooperate in detecting and amplifying color difference signals before supplying them to the color picture tube 16 for addition to the luminance signal. Whereas a hgher degree of quality may be obtained by utilizing separate matrixing stages rather than utilizing the gun of the television tube 16 for this addition, for purposes of describing the present invention this portion of the color television receiver has been shown in simplified form.

Figure 2:
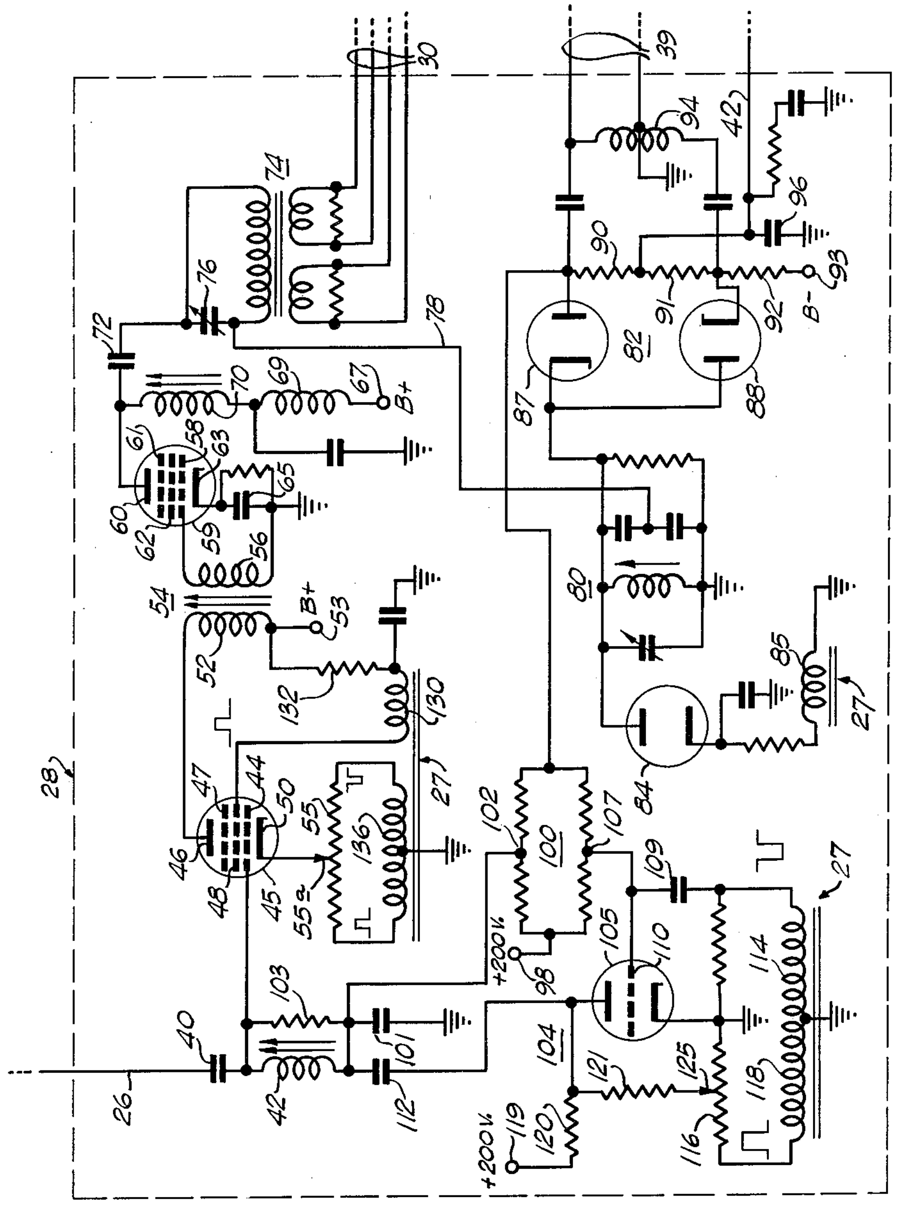
FIG. 2 is a schematic circuit diagram of the chroma section of the receiver of FIG. 1 embodying the present invention.

Referring now more particularly to FIG. 2, wherein is shown those portions of the color television receiver of FIG. 1 which embody the present invention, a signal of composite waveform containing at least the chroma signal and the burst signal, and if desired the detected luminance signal, is supplied over the conductor 26 and through the coupling network comprising the capacitor 40 and the inductor 42 to the control grid 44 of a pentode amplifier tube 45. The capacitor 40 and the inductor 42 provide a band-pass filter which prevents the detected luminance components from appearing in the chroma and burst circuits. The tube 45, which amplifies both the chroma signal and the burst signal, includes an anode 46, a suppressor grid 47, a screen grid 48, and a cathode 50. The chroma signal and the burst signal which are supplied to the signal grid 44 appear in amplified form across the primary winding 52 of a band-pass coupling transformer 54 connected between the anode 46 and a B+ terminal 53. As is more fully described hereinafter, a potentiometer 55 connected in the cathode circuit of the tube 45 provides a chroma control for adjusting the intensity of the colors in the reproduced image on the screen of the tube 16.

The amplified chroma and burst signals are coupled from the secondary winding 56 of the transformer 54 to the control grid 58 of a pentode amplifier tube 59. The pentode 59 also includes an anode 60, a suppressor grid 61, a screen grid 62 and a cathode 63, the latter being connected to ground through a capacitor 65.

As shown, the anode-to-cathode circuit of the tube 59 is energized from a source of positive potential connected between ground and a B+ terminal 67 which, as shown, is connected to the anode 60 through the series connection of inductors 69 and 70. The chroma portion of the amplified wave from the tube 60 is coupled from the anode 60 through a capacitor 72 and a band-pass transformer 74 to the color demodulators 32 (FIG. 1) via the cable 30. The burst signal portion of the output wave is coupled from the anode 60 through the capacitor 72 and through a tuned circuit comprising a capacitor 76, connected across the primary winding of the band-pass transformer 74, and over a conductor 78 to a burst take-off circuit 80 from which the burst signal is coupled to a phase detector 82 for comparison with the subcarrier frequency reference wave supplied thereto from the reference oscillator 34 illustrated in FIG. 1.

The three interstage circuits in the chroma and burst amplifier may, if desired, form a staggered triple so as to provide a flat response throughout the range of the chroma signal.

In order to prevent the burst signal from appearing in the color demodulator 32, there is provided a burst gate diode 84 which is connected in parallel with the burst take-off circuit 80 and which is conductive during reception of the chroma signal and nonconductive during reception of the burst signal. It will be apparent that since the burst take-off circuit 80 is connected in series with the primary circuit of the chroma output transformer 74, when the circuit 80 is short-circuited by the burst gate diode 84 during reception of the chroma signal, the entire chroma signal is developed across the output transformer 74. During the retrace interval, however, when the burst signal is being received and the diode 84 is nonconductive, the burst signal is developed across the take-off circuit 80 and is coupled to a phase detector 82. The diode 84 is normally conductive and is rendered nonconductive by a positive gating pulse of voltage which is developed across a winding 85 on the horizontal output transformer 27 (FIG. 1), and is connected to the cathode of the diode 84.

Considering the phase detector 82 in greater detail, the burst signal is coupled from the burst take-off circuit 80 to the cathode and anode, respectively, of the diodes 87 and 88 in the phase detector 82. The other electrodes of these diodes are connected together in a conventional manner through a series connection of a pair of load resistors 90 and 91. The phase detector 82 is energized by a unidirectional voltage provided across the resistors 90 and 91 from a B+ terminal 98 and a B− terminal 93, the terminal 93 being connected to the cathode of the diode 88 through a resistor 92. The subcarrier frequency reference wave which is supplied across a part of the winding 94 of the phase detector 82 is compared with the received burst signal to develop across a capacitor 96 a composite waveform having an average value which is dependent upon the phase difference between the received burst signal and the locally developed subcarrier frequency reference wave. This voltage, which is an AFC voltage, is coupled to the reactance tube 36 via the conductor 42.

In addition to the AFC voltage which is developed across the capacitor 96, an automatic chrominance control voltage is developed in the phase detector 82. Since the amplitude of the burst signal applied to the phase detector 82 greatly exceeds the level of the reference wave supplied thereto from the oscillator 34, there is developed with respect to ground at the top of the resistor 90 a unidirectional ACC voltage having a magnitude dependent upon the amplitude of the burst signal which is supplied to the phase detector 82. This ACC voltage may be reduced to the desired level for application to the grid 44 of the pentode 45 by connecting a voltage divider circuit 100 between the B+ terminal 98 and the resistor 90. Accordingly, the negative ACC voltage which controls the pentode 45 may be developed across a capacitor 101 which is interconnected between ground and a voltage tap 102 in the network 100. By proper selection of the parameters in the divider 100 the ACC voltage developed across the capacitor 101 has a negative polarity and when coupled through a resistor 103 to the control grid 44 of the pentode 45 maintains the output signal thereof relatively constant irrespective of variations in the strength of the received signal.

In order to cut off the chroma circuits of the receiver during reception of a monochrome picture or whenever the strength of the received burst signal is too low to synchronize the reference oscillator 34, there is provided a color killer circuit 104 which includes a color killer tube 105. During reception of a normal color signal the tube 105 is held cut off by the negative ACC signal developed in the phase detector 82. In the absence of a burst signal, however, the tube 105 becomes conductive and supplies highly negative pulses of voltage via the capacitor 112 to the control grid 44 of the pentode 45 so as to bias the pentode 45 nonconductive during reception of the chroma signal.

Considering the color killer circuit 104 in greater detail, the pentode 105 includes a control grid 110 to which is supplied the ACC voltage from a take-off terminal 107 in the divider 100, and an anode which is energized from a B+ terminal 119 through a load resistor 120. The grid 110 is also supplied with negative pulses of voltage during the retrace interval from a winding 114 on the horizontal output transformer 27. These negative pulses of voltage are coupled through a capacitor 109 to the grid 110 so that unless the tube 105 is cut off by the ACC voltage, these pulses are amplified and coupled across the capacitor 101. Under such circumstances the control grid of the pentode 105 is biased beyond cut-off during reception of the chroma signal.

It is desirable to provide means for adjusting the level of the ACC voltage which is developed in the phase detector 82 without altering the balance of that circuit. This is accomplished by supplying pulses of voltage of adjustable amplitude to the capacitor 101 during the retrace interval. More specifically, a winding 118 on the horizontal output transformer is serially connected to ground through a potentiometer 116 and the adjustable output therefrom is coupled from a tap 125 on the potentiometer 116 through a resistor 121 and the capacitor 112 across the capacitor 101.

It may thus be seen that the circuit arrangement of FIG. 2 provides an ACC control bias for the pentode 45 which varies in accord with the strength of the received burst signal. Moreover, both the chroma signal and the burst signal are amplified in the same amplifier. Because, however, the ACC signal is only developed during the retrace interval and since the chroma and burst signals tend to set up at different grid levels on the pentode 45, it has been found, with prior art type circuits, that under such circumstances automatic control of the chroma signal is not achieved. Furthermore, in order to provide a suitable gain for the burst signal it has been necessary to operate the pentode 45 so that only a negligible gain for the chroma signal is provided.

Figure 4:
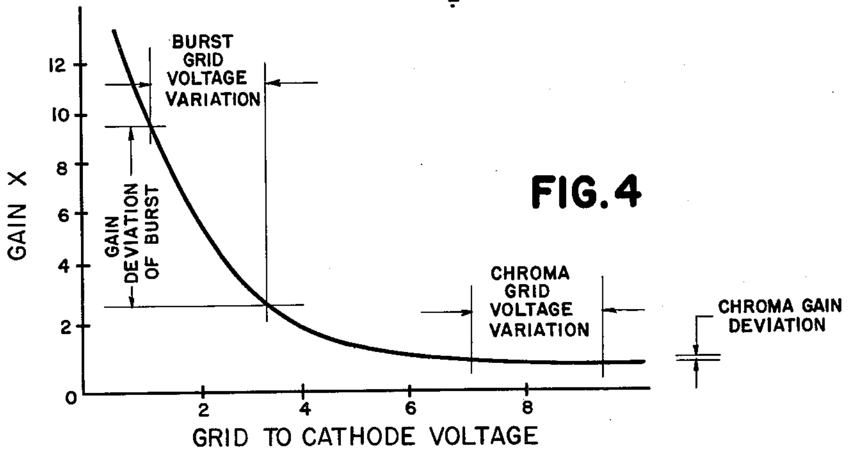
FIGS. 4 and 5 are graphs useful in understanding the operation of the present invention.

Referring to FIG. 4, there is shown the operating characteristic of a typical remote cut-off pentode ordinarily used for chroma signal amplification. One such tube is the 6V8. With prior art type circuit arrangements in which only the burst signal is automatically controlled, when the burst is set up on the grid 44 at about 2 volts, the chroma sets up at about 8 volts. This provides a satisfactory gain for the burst signal but the chroma signal tends to cut off since the gain deviation at this point on the operating curve is negligible. It would be desirable, therefore, to provide this difference in gain between the chroma and burst signals while still providing an adequate gain for the chroma signal.

In accordance with the present invention this desideratum is achieved. The pentode 45 is operated in such a way that a substantial gain is provided for both the chroma signal and the burst signal, and moreover, the gain of the pentode 45 is automatically controlled for both chroma and burst so that both chroma and burst are set up at the same grid level. Referring to FIG. 2 it may be seen that a winding 130 on the horizontal output transformer 27 is serially connected with the screen dropping resistor 132 between the B+ terminal 53 and the screen grid 48 of the pentode 45. The gating voltage thus produced across the winding 130 substantially increases the gain of the pentode 45 during the retrace interval so that the gain during burst is substantially greater than the gain during chroma.

Figure 5:
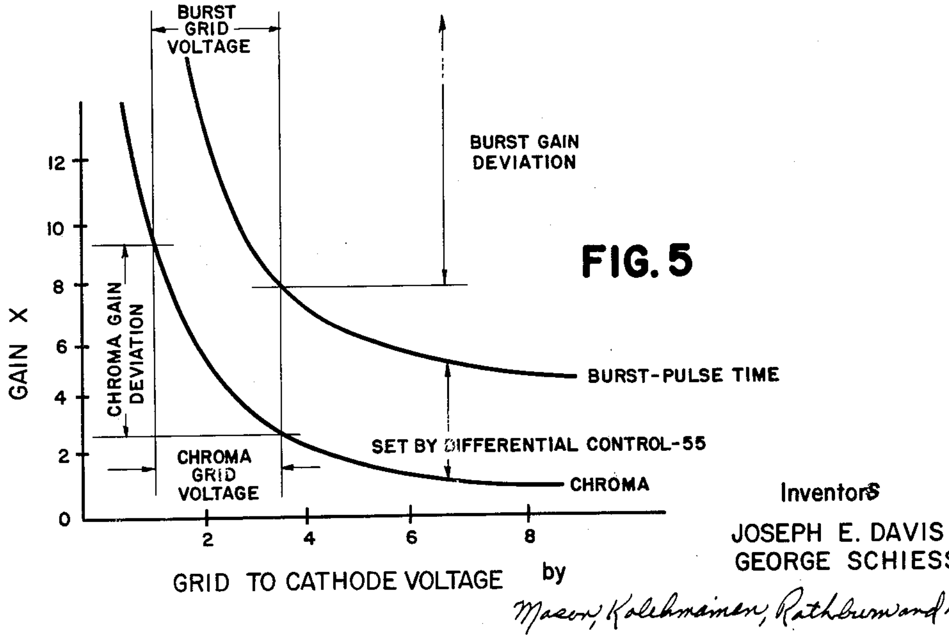

Referring to FIG. 5, wherein is shown the operating curves of the pentode 45 when connected in the circuit arrangement of FIG. 2, the curve 140 represents the condition when the screen 48 is not pulsed and the curve 141 corresponds to the condition when the screen 48 is pulsed. It may be seen that the increased gain during burst is achieved by shifting the operating characteristic curve of the tube 45 rather than shifting the operating point on the curve. The spacing between the curves 140 and 141 and thus the change in the gain of the tube between chroma and burst is adjusted by means of the potentiometer 55 which is connected across a center tapped winding 136 on the horizontal output transformer 27 to provide a differential cathode bias control. With this arrangement, the tap **55*a* may be positioned such that the bias on the tube 45 increases or decreases during the retrace interval. The potentiometer 55 thus sets the operating bias on the tube 45 during chroma and it may be adjusted so that both the chroma and burst signals are set up at the same grid level. This condition is shown in FIG. 5 wherein both signals are set up at about two volts. Because the grid voltage is automatically controlled at this level by the ACC signal from the phase detector 82, the circuit of the present invention provides automatic chrominance control of the amplifier 45** for both chroma and burst.

Figure 3:
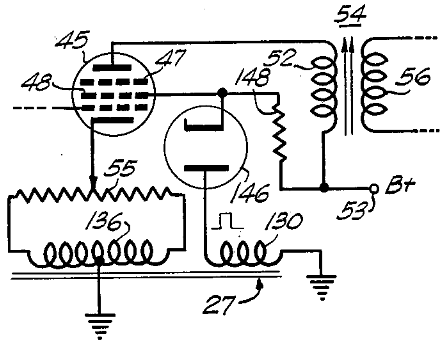
FIG. 3 is an alternative embodiment of the invention.

Referring to FIG. 3 there is shown an alternative embodiment of the present invention. This circuit is similar to that of FIG. 2 but employs a diode 146 to gate the screen grid 48 positively during the retrace interval so that the tube 45 may be operated degeneratively during reception of the chroma signal and the coil 130 may be grounded. In FIG. 3 only that portion of the circuit of FIG. 2 which is directly concerned with the modification is shown and similar parts have been designated with like reference numerals. In this alternative embodiment of the invention the diode gate tube 146 is serially connected between the winding 130 on the transformer 27 and the screen grid 48 so that the screen 48 is operated degeneratively except when the pulse from the winding 130 is applied thereto. Accordingly, the tube 45 is operated at its maximum gain during the retrace interval when the burst signal is received but during reception of the chroma signal, a linear response is provided by the degenerative signal which is developed across the resistor 148.

It may thus be seen that there is provided in accordance with the present invention an improved chroma and burst amplifier which, while employing a single pentode tube, has the advantages of providing the characteristics of two individual pentode tubes, one being used for amplifying a chroma signal and the other having a higher gain and being used for amplifying the burst signal.

While the invention has been described in connection with particular embodiments thereof, it will be understood that those skilled in the art may make many changes and modifications without departing from the invention. Therefore, in the appended claims it is intended to cover all such changes and modifications as fall within the true spirit and scope of the invention.

What is claimed as new and is desired to be secured by Letters Patent of the United States is:

1. In a color television receiver the combination comprising a source of composite color television signals including burst and chroma information; a pentode amplifier having an anode circuit, a grid-cathode circuit and a screen grid circuit; a source of retrace gating pulses; a source of signal related automatic gain control voltage; means coupling said source of television signals to said amplifier grid-cathode circuit to supply an input signal; means coupled between said source of retrace gating pulses and said grid-cathode circuit for providing a grid bias potential shift during retrace sufficient to allow the input burst information and the input chroma information to be controlled through substantially the same control range by a common automatic gain control voltage; means for coupling said source of automatic gain control voltage to said grid-cathode circuit; and means for coupling said source of retrace gating pulses to said screen grid circuit for increasing the screen grid potential and amplifier gain during the retrace period when burst information is being amplified.

2. In a color television receiver the combination comprising a source of composite color television signals including burst and chroma information; a pentode amplifier having an anode circuit, a grid-cathode circuit and a screen grid circuit; a source of retrace gating pulses; a source of burst information related automatic gain control voltages; means coupling said source of television signals to said amplifier grid-cathode circuit to supply an input signal; means coupled between said source of retrace gating pulses and the said grid-cathode circuit for providing a grid bias potential shift during retrace sufficient to allow the input burst information and the input chroma information to be controlled through substantially the same control range by a common automatic gain control voltage; means for coupling said source of automatic gain control voltage to said grid-cathode circuit; and means for coupling said source of retrace gating pulses to said screen grid circuit for increasing the screen grid potential and amplifier gain during the retrace period when burst information is being amplified.

References Cited in the file of this patent

UNITED STATES PATENTS

| | | |
|---|---|---|
| 2,681,948 | Avins | June 22, 1954 |
| 2,743,311 | Richman | Apr. 24, 1956 |
| 2,798,900 | Bradley | July 9, 1957 |
| 2,837,595 | Green | June 3, 1958 |
| 2,880,266 | Parker | Mar. 31, 1959 |

OTHER REFERENCES

RCA Model 21–CT–55, Service data 1954, #T13; November 12, 1954.

RCA Model 21–CT–660U, Service data 1955, #T5; December 9, 1955.